(12) United States Patent
Gaertner (10) Patent No.: US 8,140,744 B2
(45) Date of Patent: Mar. 20, 2012

(54) METHOD AND SYSTEM FOR INCREASING DATA STORAGE RELIABILITY AND EFFICIENCY VIA COMPRESSION

(75) Inventor: Mark Allen Gaertner, Vadnais Heights, MN (US)

(73) Assignee: Seagate Technology LLC, Cupertino, CA (US)

( * ) Notice: Subject to any disclaimer, the term of this patent is extended or adjusted under 35 U.S.C. 154(b) by 1346 days.

(21) Appl. No.: 10/883,236

(22) Filed: Jul. 1, 2004

(65) Prior Publication Data

US 2006/0005069 A1    Jan. 5, 2006

(51) Int. Cl.
G06F 12/00    (2006.01)
G06F 13/00    (2006.01)
G06F 13/28    (2006.01)

(52) U.S. Cl. ........ 711/112; 711/173; 714/6.24; 714/701

(58) Field of Classification Search .................... 711/112
See application file for complete search history.

(56) References Cited

U.S. PATENT DOCUMENTS

| | | | |
|---|---|---|---|
| 5,237,675 A | | 8/1993 | Hannon |
| 5,394,534 A | * | 2/1995 | Kulakowski et al. .......... 711/112 |
| 5,396,376 A | * | 3/1995 | Chambors et al. ............. 360/48 |
| 5,652,857 A | * | 7/1997 | Shimoi et al. .................. 711/113 |
| 6,028,725 A | | 2/2000 | Blumenau |
| 6,076,143 A | | 6/2000 | Blumenau |
| 6,170,037 B1 | | 1/2001 | Blumenau |
| 6,191,710 B1 | * | 2/2001 | Waletzki .......................... 341/63 |
| 6,243,081 B1 | * | 6/2001 | Goris et al. ..................... 345/555 |
| 6,295,176 B1 | * | 9/2001 | Reddy et al. .................... 360/48 |
| 6,449,116 B2 | | 9/2002 | Morris |
| 6,532,121 B1 | | 3/2003 | Rust |
| 2003/0058355 A1 | | 3/2003 | Wong |
| 2004/0015713 A1 | | 1/2004 | Abe |
| 2010/0088464 A1 | * | 4/2010 | Yang .............................. 711/103 |

FOREIGN PATENT DOCUMENTS

JP    05166299 A2    7/1993

OTHER PUBLICATIONS

Microsoft Computer Dictionary, 2002; Definition of "sector".*
American Heritage Dictionary, 2002-2004, Definiton of "correspond".*
American Heritage Dictionary. Houghton Mifflin Company. Fourth Edition. 2004. "Definition of have", p. 635.*
Khu Arthur, Xilinx FPGA Configuration Data Compression & Decompression Sep. 25, 2001 4 pages.
Patent Application STL11150 Method and Apparatus to Improve Magnetic Disc Drive Reliability Using Excess Un-Utilized Capacity filed Oct. 16, 2003.

* cited by examiner

*Primary Examiner* — Brian Peugh
*Assistant Examiner* — Prasith Thammavong
(74) *Attorney, Agent, or Firm* — Deirdre Megley Kvale; Westerman, Champlin & Kelly, P.A.

(57) ABSTRACT

A method and a system is provided for increasing reliability of data stored in storage segments by increasing redundancy data and by permitting user data to fit around defective locations in the storage segment. User data is compressed and reserved for a portion of a storage segment having a data size corresponding to an uncompressed size of the user data. The compressed user data is written to the reserved portion of the storage segment and a pad byte pattern is written to any remaining portion of the reserved portion of the storage segment. The remaining portion of the reserved portion of the storage segment is designated as unused.

20 Claims, 10 Drawing Sheets

METHOD AND SYSTEM FOR INCREASING DATA STORAGE RELIABILITY AND EFFICIENCY VIA COMPRESSION

FIELD OF THE INVENTION

The present invention relates generally to the field of data storage systems. In particular, the present invention relates to increasing the reliability of data stored in a data storage system.

BACKGROUND OF THE INVENTION

Data storage systems, such as disc drives, typically store information on surfaces of storage media such as magnetic or optical discs. In a typical disc drive, a number of discs are mounted together on a spindle to form a disc stack. The spindle causes the discs to spin and the data surfaces of the disc to pass under respective hydrodynamic and aerodynamic bearing disc head sliders. These head sliders are typically mounted on an actuator arm that moves the head sliders in tandem over the disc surfaces such that all of the head sliders are at the same approximate disc radius at the same time.

When information is stored on a disc it is generally stored in a set of concentric data tracks. The tracks on the disc surface are typically divided into data sectors. Data sectors are the basic units of data storage on a disc surface. A sector is a "pie-shaped" angular section of a track that is bounded on two sides by radii of the disc and on the other side by the perimeter of the circle that defines the track. In other words, the sector is a small storage segment along the length of a track.

Most tracks are available for read/write access by the host computer. These tracks contain user data. Generally, defective media, such as discs, are one of the prime sources of error in either temporary or permanent data retrieval. For example, some defective sectors can form at the time of disc manufacture. Other defects, however, can arise in any of the sectors at various times during the lifetime of the storage system (grown defects). Grown defects include, for example, invading foreign particles which become embedded onto the surface of the disc, or external shocks to the storage system which can cause the transducer to nick or crash onto the surface of the disc.

More recently, capacity growth of storage media has outpaced demand. The increased capacity of storage media has pushed data closer and closer together which puts stress on the reliability of data. Although error recovery mechanisms in the disc drive can aid in recovering data from defective portions of the media, error recovery mechanisms can not recover all data that is located on defective portions of the media.

Embodiments of the present invention provide solutions to these and other problems, and offer other advantages over the prior art.

SUMMARY OF THE INVENTION

A method and a system is provided for increasing reliability of data stored in storage segments by increasing redundancy data and by permitting user data to fit around defective locations in the storage segment. User data is compressed and reserved for a portion of a storage segment having a data size corresponding to an uncompressed size of the user data. The compressed user data is written to the reserved portion of the storage segment and a pad byte pattern is written to any remaining portion of the reserved portion of the storage segment. The remaining portion of the reserved portion of the storage segment is designated as unused.

Other features and benefits that characterize embodiments of the present invention will be apparent upon reading the following detailed description and review of the associated drawings.

DETAILED DESCRIPTION OF ILLUSTRATIVE EMBODIMENTS

Embodiments of the present invention are directed towards compressing user data such that user data can be written around defective locations in a storage segment. By writing compressed user data around defective locations, the reliability of user data in any given storage segment is maintained. In some embodiments, user data reserved for a portion of a storage segment is compressed and written to the reserved portion of the storage segment. Any remaining portion of the reserved portion is filled with a pad byte pattern. In other embodiments, user data is compressed and written to the reserved portion of the storage segment. The remaining portion of the reserved portion is filled with more error correction data or redundancy data. Any remaining portion of the reserved portion is filled with a pad byte pattern.

Figure 1:
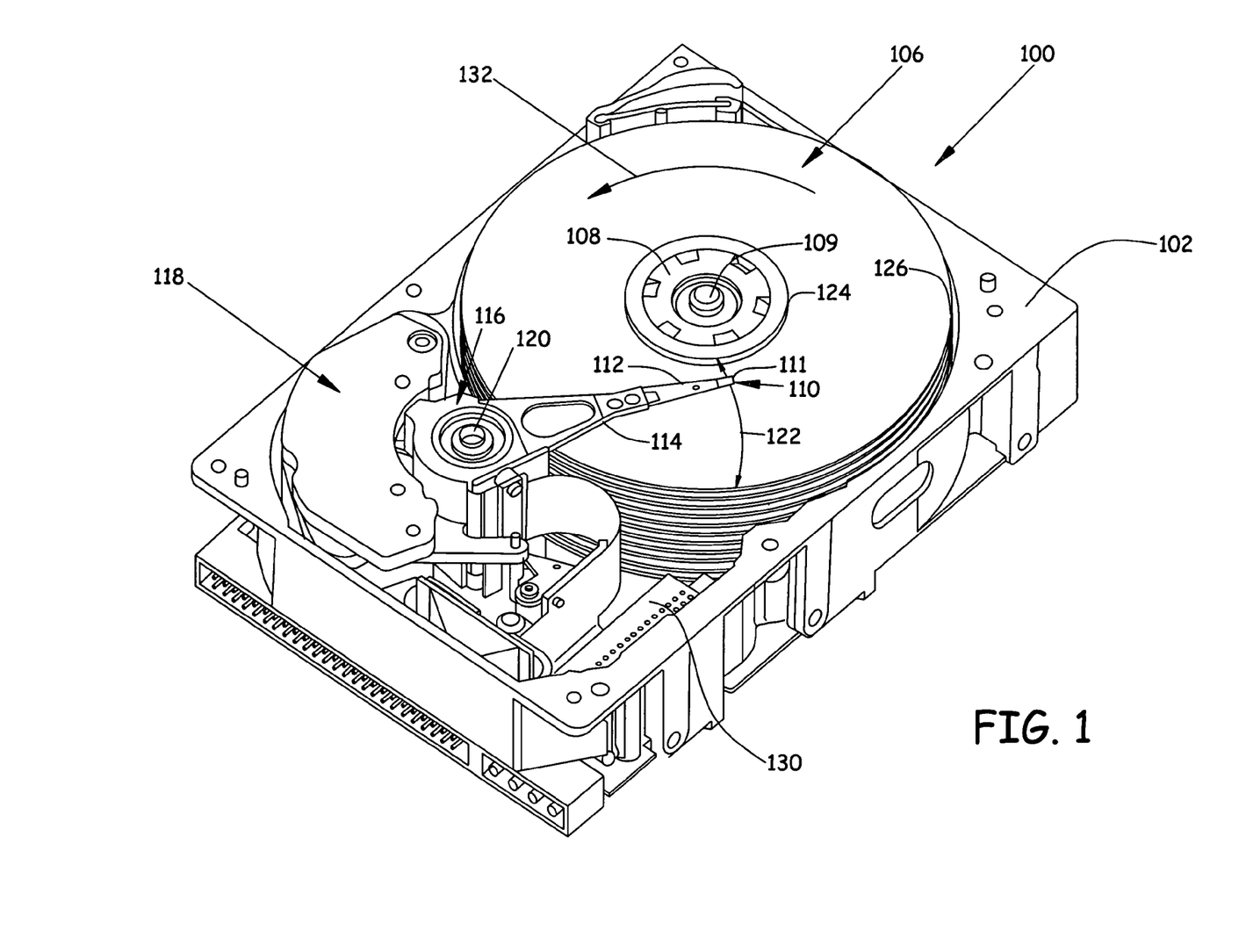
FIG. 1 is a perspective view of a disc drive.

FIG. 1 is a perspective view of disc drive 100 with which the present invention is useful. Disc drives are common data storage systems. Disc drive 100 includes a housing with a base deck 102 and top cover (not shown). Disc drive 100 further includes media 106, which is mounted on a spindle motor (not shown in FIG. 1) by a disc clamp 108. Media 106 can include one or more discs and is illustrated with a plurality of individual discs 107, which are mounted for co-rotation about axis 109 in a direction indicated by arrow 132. Each disc surface has an associated slider 110 which carries a read/write head for communication with the disc surface. In FIG. 1, sliders 110 are supported by suspension 112 which is in turn attached to track accessing arm 114 of an actuator mechanism 116. Actuator mechanism 116 is of the type known as a rotary moving coil actuator and includes a voice coil motor (VCM), shown generally at 118. VCM 118 rotates actuator 116 about pivot shaft 120 to position sliders 110 over a desired data track along an arcuate path 122 between a disc inner diameter 124 and a disc outer diameter 126. Each slider 110 includes a read/write head 111 for reading data from and writing data to discs 107. VCM 118 is driven by electronic circuitry 130 based on signals generated by the read/write heads.

Figure 2:
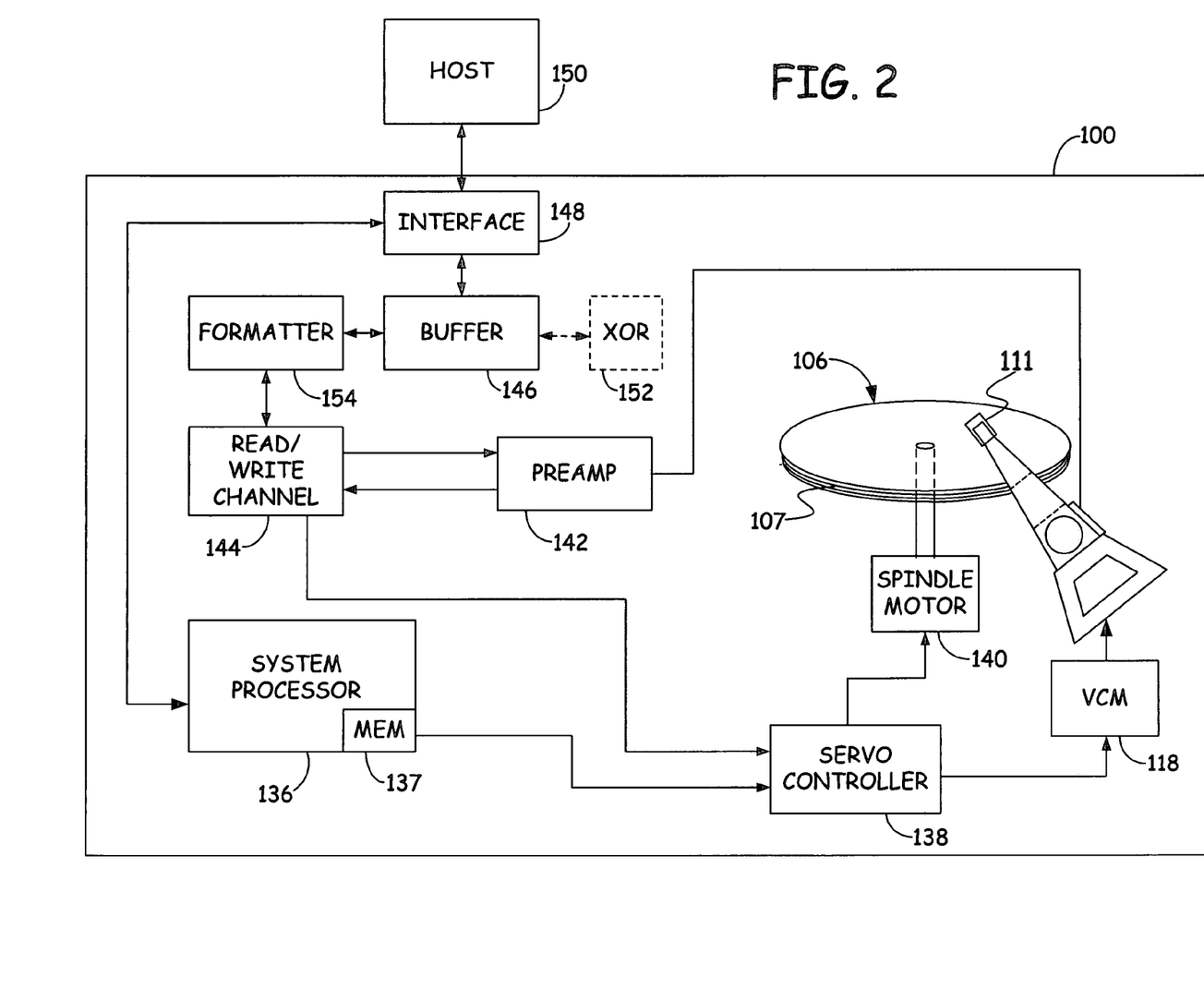
FIG. 2 is a simplified block diagram of the disc drive illustrated in FIG. 1.

FIG. 2 is a simplified block diagram of disc drive 100 as perspectively illustrated in FIG. 1 in accordance with an embodiment of the present invention. As previously discussed in FIG. 1, media 106 includes a plurality of discs 107. Each disc 107 has a plurality of substantially concentric circular tracks. Each track is subdivided into a plurality of storage segments or data sectors. As defined herein, a storage segment is the basic unit of data storage in media 106. Storage segments or data sectors are "pie-shaped" angular sections of a track that are bounded on two sides by radii of the disc and on the other side by the perimeter of the circle that defines a track. Each track has a related linear logical block address (LBA). A cylinder address, head address and sector address are all included and derived from each LBA. A cylinder identifies a set of specific tracks on the disc surfaces for each disc 107 which lie at equal radii and are accessible by the collection of read/write heads 111. The head address identifies which head can read the data and therefore identifies which disc from the plurality of discs 107 the data is located. As mentioned above, each track within a cylinder is further divided into segments for storing data and servo information. A segment is identified by an associated sector address.

Figures 3, 4, 5:
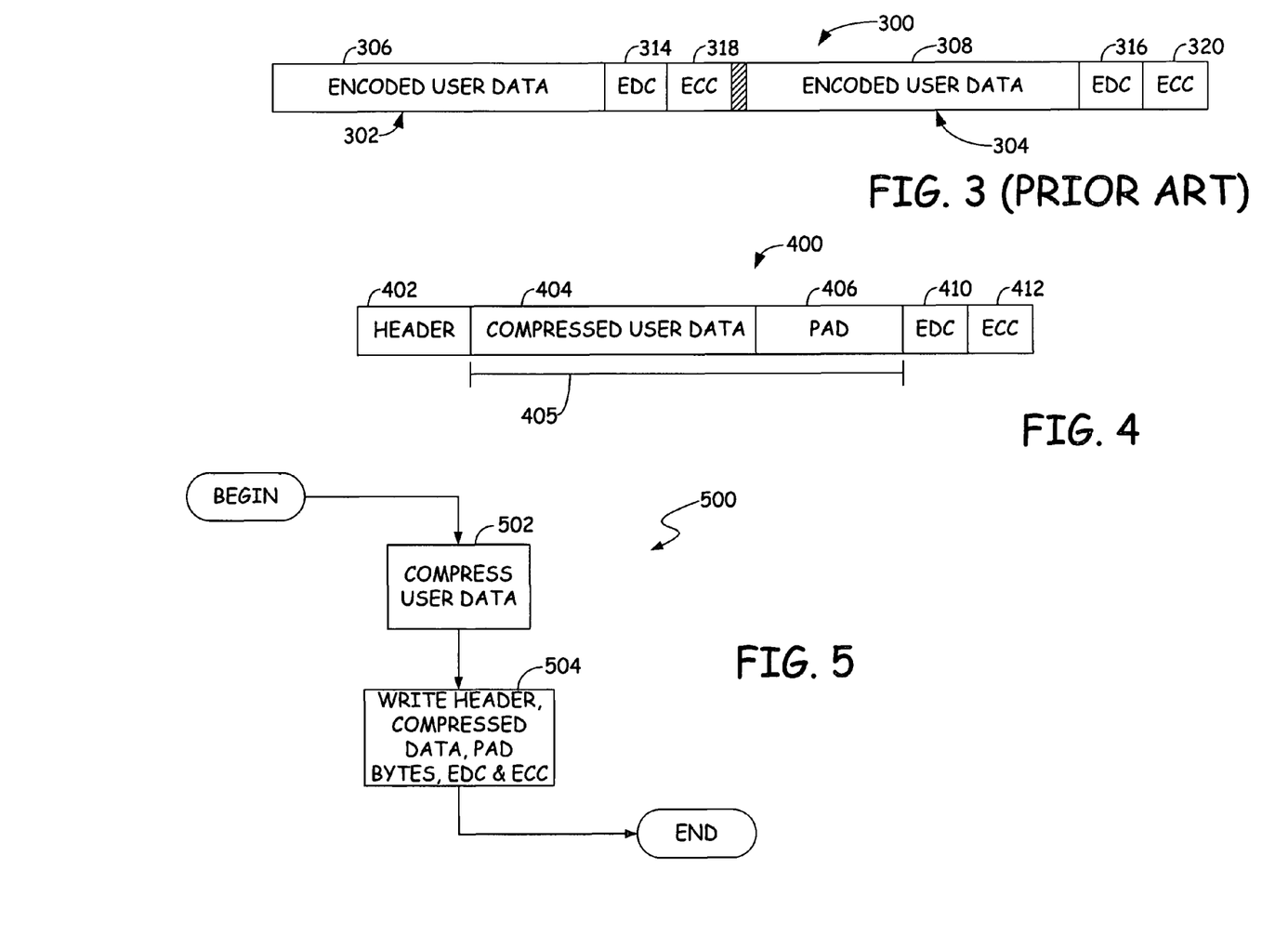
FIG. 3 illustrates an example track showing two storage segments in accordance with the prior art.
FIG. 4 illustrates a storage segment in accordance with an embodiment of the present invention.
FIG. 5 illustrates a generalized flowchart describing the process of writing data to the storage segment illustrated in FIG. 4 in accordance with an embodiment of the present invention.

FIG. 3 illustrates an example track 300 showing two storage segments 302 and 304 in accordance with the prior art. Storage segments 302 and 304 include encoded user data 306 and 308 followed by different types of redundancy or error correction data. As illustrated in FIG. 3, encoded user data 306 and 308 are followed by error detection correction code (EDC) data 314, 316 and error correction code (ECC) data 318, 320. However, those skilled in the art should recognize that any type of redundancy data can be included in storage segments 302 and 304 to correct data. EDC 314, 316 is used to detect if user data is in error when a read operation is being executed. ECC 318, 320 is used to correct errors detected by EDC 314, 316.

Referring back to FIG. 2, disc drive 100 includes a servo controller 138 configured to generate control signals applied to VCM 118 and spindle motor 140. Servo controller 138 is also responsive to servo data, such as servo burst information recorded on disc 107 in embedded servo fields included in storage segments. Disc drive 100 also includes a system processor 136, which is used for controlling certain operations of disc drive 100, with the use of programming stored in memory 137, in a known manner. For example, system processor 136 generates control signals to servo controller 138 in order to seek head 111 to desired tracks.

In accordance with the present invention, the operations of writing and reading storage segments is a global operation that requires many disc drive components and will be generally referred to as processing circuitry. Generally, during a write operation, system processor 136 instructs servo controller 138 to generate control signals to be applied to VCM 118 and spindle motor 140 such that head 111 seeks to a desired track for writing. User data is provided to buffer 146 through interface 148 from host 150. Formatter 154 retrieves the data from buffer 146, computes redundancy information, appends it to the user data and transfers the user data and redundancy data to read/write channel 144. In preparing the data for transfer to read/write channel 144, formatter 154 packages the data so it can be laid down on the media according to a desired format, such as the format shown in FIG. 3. Once the data is received by read/write channel 144, read/write channel 144 provides encoded write data to preamplifier (preamp) 142. Preamp 142 generates a write signal based on the encoded write data received from read/write channel 144 and applies the write signal to head 111.

Generally, during a read operation, system processor 136 instructs servo controller 138 to generate control signals to be applied to VCM 118 and spindle motor 140 such that head 111 seeks to a desired track for reading. Preamp 142 amplifies a read signal emanating from head 111 to read/write channel 144. Read/write channel 144 processes the read signal amplified by preamp 142 to detect and decode data recorded on disc 107. The decoded data is provided to formatter 154 and, after error correction and temporary storage in buffer 146, ultimately through interface 148 to host 150.

In some instances, disc drive 100 can be part of a redundant array of independent discs (RAID) system. A RAID system employs two or more disc drives in combination to improve fault tolerance and performance of data storage. In some RAID systems, data is duplicated on two discs simultaneously. In this type of RAID system, if one disc fails, the system can instantly switch to the other disc without any loss of data. In general, RAID systems utilize exclusive-OR operator hardware to compute parity as a means of error detection. Thus, as illustrated in FIG. 2, disc drive 100 optionally includes an Exclusive-OR operator 152 to support various commands for RAID systems.

As will be discussed below in FIGS. 4-14, the present invention includes a method and apparatus of improving reliability of storage media by compressing user data on a sector-by-sector basis. The present invention eliminates the logical to physical mapping complications of compressing data for the sake of capacity. In general, the compression of user data reduces the amount of media used to store data since the space freed via compression is not used. In accordance with an embodiment of the present invention and as will be discussed below, compression circuitry is configured to compress data. Compression circuitry can be located in many different components and will also be discussed below.

FIG. 4 illustrates a storage segment 400 in accordance with an embodiment of the present invention. Storage segment 400 has a storage segment size. Storage segment 400 includes a header 402, compressed user data 404, a pad byte pattern 406 followed by redundancy data such as EDC data 410 and ECC data 412. Header 402 includes information related to the compressed user data. At a minimum, header 402 includes the size or length of the compressed user data. Compressed user data 404 is reserved for a reserved portion 405 of storage segment 400. Typically, the length of reserved portion 405 is 512 bytes. Reserved portion 405 of storage segment 400 has a data size corresponding to an uncompressed size of user data. A pad byte pattern 406 is allocated to any remaining portion of the reserved portion 405. Pad byte pattern 406 is meaningless data such that the remaining portion of the reserved portion 405 is filled and designated as unused data. Those skilled in the art should recognize that the order of components 402, 404, 406, 410 and 412 in storage segment 400 need not be organized as shown in FIG. 4. Each component can reside in any order in storage segment 400.

FIG. 5 illustrates a generalized flowchart 500 describing the process of writing data to storage segment 400 in accordance with an embodiment of the present invention. At block 502, user data is compressed prior to writing the user data to a storage segment such that header 402 can be determined. User data is compressed via compression circuitry.

In one embodiment, compression circuitry can be isolated to host 150 (FIG. 2). In this embodiment, a minimal amount of compression circuitry storage space is required. In addition, user data temporarily stored in buffer 146 (FIG. 2) can be compressed. Thus, bandwidth requirements of buffer 146 are reduced, buffer power is reduced and more logical data can fit within buffer 146. Data in an exclusive-OR operator 152 (FIG. 2), however, cannot be compressed when the compression circuitry resides in host 150.

In another embodiment, compression circuitry can be isolated to buffer 146. In this embodiment, a minimal amount of compression logic storage space is required. In addition, user data temporarily stored in buffer 146 can be compressed as well as data in exclusive-OR operator 152. Although, more logical data can fit within buffer 146 in this embodiment, a large buffer bandwidth and buffer power is required.

In yet another embodiment, compression circuitry can reside in both host 150 and exclusive-OR operator 152. In this embodiment, user data temporarily stored in buffer 146 can be compressed as well as data in exclusive-OR operator 152. Thus, bandwidth requirements of buffer 146 are reduced, buffer power is reduced and more logical data can fit within buffer 146.

In yet another embodiment, compression circuitry can reside in both host 150 and formatter 154 (FIG. 2). In this embodiment, user data temporarily stored in buffer 146, data residing in exclusive-OR operator 152 as well as any other user data residing in other components of disc drive 100 (FIGS. 1 and 2) can be compressed. Thus, bandwidth requirements of buffer 146 are reduced, buffer power is reduced and more logical data can fit within buffer 146.

In yet another embodiment, compression circuitry can be isolated to formatter 154. In this embodiment, a minimal amount of compression logic is required and data residing in exclusive-OR operator 152 and other data residing in other components of disc drive 100, besides buffer 146, can be compressed. However, data temporarily stored in buffer 146 is not compressed. Thus, buffer 146 cannot include bandwidth, power and buffer efficiency optimizations.

After user data has been compressed by compression circuitry, header 402, compressed user data 404, pad byte pattern 406, EDC 410 and ECC 412 are written to storage segment 400 at block 504. After writing at block 504, the writing process ends.

Figure 6:
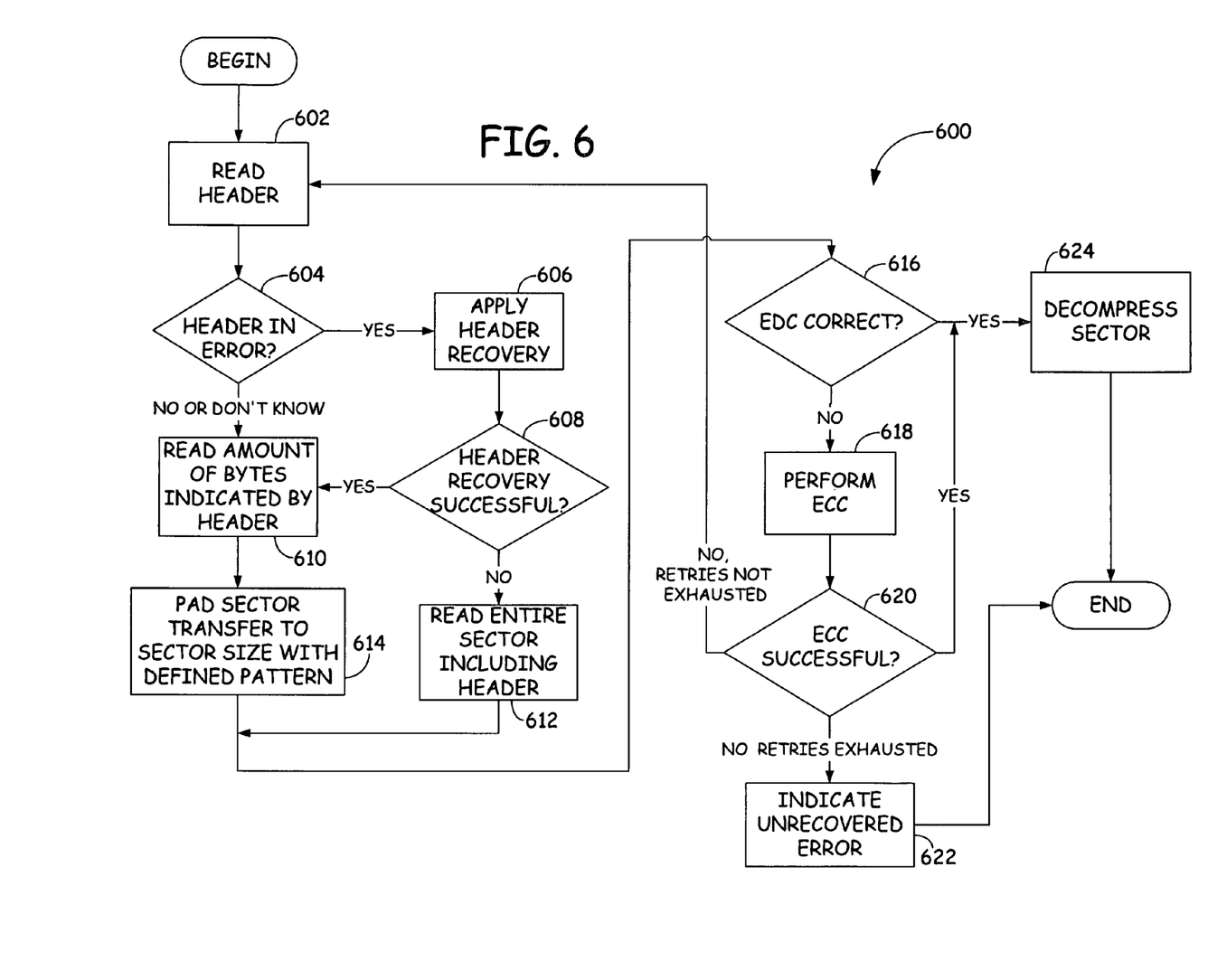
FIG. 6 illustrates a generalized flowchart describing the process of reading data from the storage segment illustrated in FIG. 4 in accordance with an embodiment of the present invention.
Figure 7:
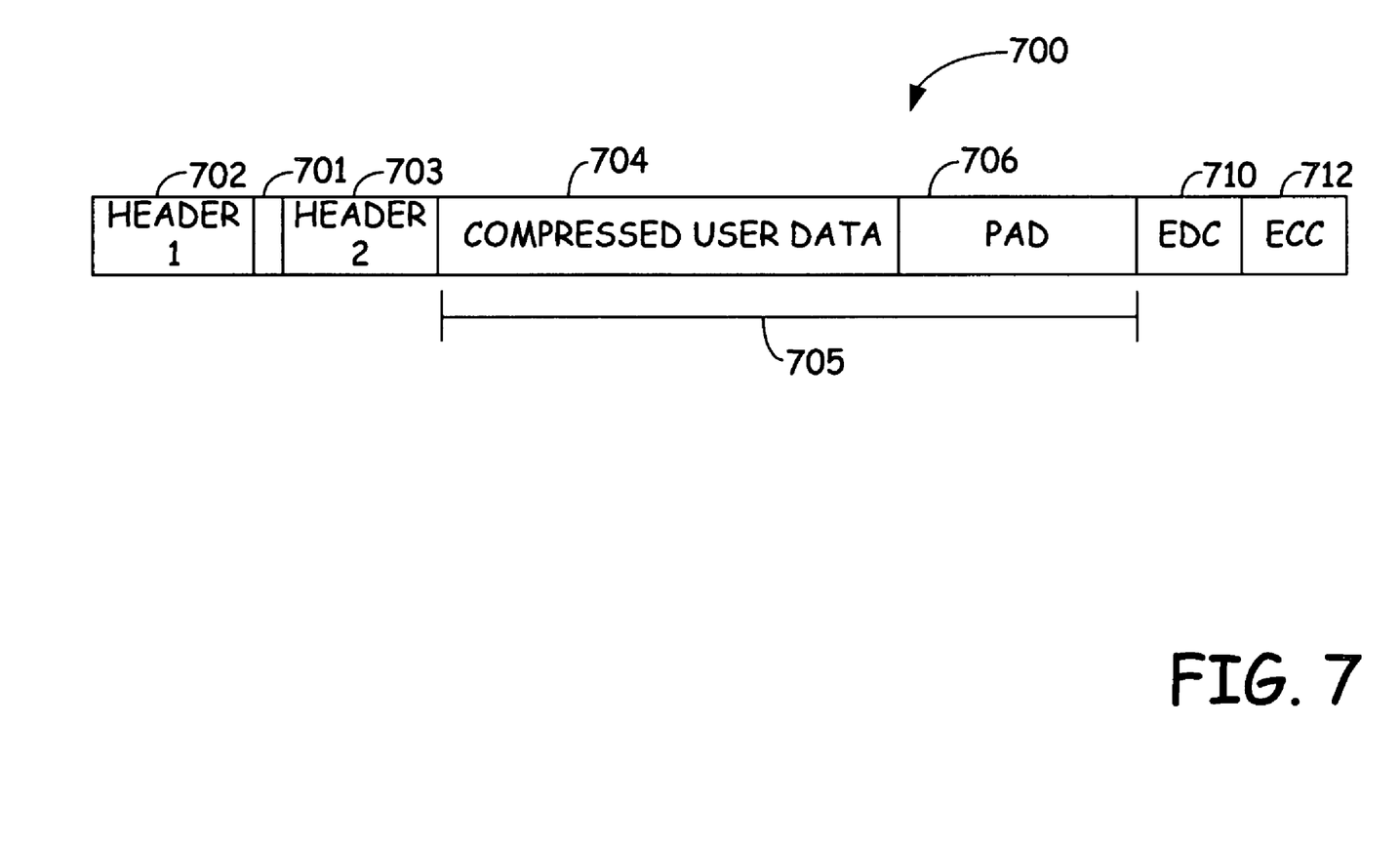
FIG. 7 illustrates a storage segment in accordance with an embodiment of the present invention.

FIG. 6 illustrates a generalized flowchart 600 describing the process of reading data from storage segment 400 in accordance with an embodiment of the present invention. The process of reading storage segment 400 begins at block 602 by reading header 402. At block 604, the reading process determines if header 402 is in error. If header 402 is in error, a header recovery routine is applied to header 402 at block 606. If, however, header 402 is not in error or it is not known whether header 402 is in error, then control passes to block 610. For example, disc drive 100 can perform header recovery of header 402 by using portions of EDC data 410 and ECC data 412 or other redundancy data reserved for header recovery. In another example, a second header or a plurality of headers can be incorporated into a storage segment as illustrated in FIG. 7 such that a header is more likely to be recovered.

In FIG. 6 and in the case of a single header, control passes to block 608 after header recovery. The reading process determines whether the applied header recovery was successful. If the header recovery was successful, control passes to block 610. If, however, the header recovery was unsuccessful in recovering data in header 402, control passes to block 612. At block 610, the reading process reads the length or bytes of compressed user data as indicated by header 402 if the header is either not in error or header recovery was successful. After reading the compressed user data, control is passed to block 614. At block 614, the reading process proceeds to pad sector transfer to sector size with defined pattern instead of reading pad byte pattern 406. Since pad byte pattern 406 is known, meaningless data, block 614 eliminates a source of error by ignoring pad byte pattern 406 and padding in the data. The reading process, however, reads the entire storage segment 400 including header 402 at block 612 if header recovery was unsuccessful. The reading process proceeds to block 616 after completion of either block 612 or 614.

At block 616, the reading process uses EDC data 410 to detect if any errors exist in reading compressed user data 404. If EDC data 410 determines that no errors exist, control passes to block 624. At block 624, the process decompresses the compressed user data. If, however, errors exist, control passes to block 618 and the process performs error correction using ECC data 412. The process proceeds to block 620 and determines whether error correction was successful. If error correction was successful, then the process proceeds to block 624, decompresses the compressed user data and the reading process ends. If error correction is unsuccessful, then the process either proceeds to block 602 or block 622. The process proceeds to block 602 if an amount of retries for correcting errors is not exhausted. The process, however, proceeds to block 622 if all retries for error correction are exhausted. In the latter situation, the process indicates that there is an unrecovered error and the process ends. In the former situation, the process proceeds to block 602 and rereads the header. Again, control passes to block 604 to determine if the header is in error and proceeds through the above-described process to perform error correction if need be until user data can be decompressed in block 624 or the reading process indicates that there is an unrecoverable error in block 622.

As illustrated in FIGS. 4-6, this embodiment of the present invention improves the reliability of storage media by compressing user data on a sector-by-sector basis and filling the remaining space in the storage segment with a pad byte pattern. Generally, the compression of data will reduce the amount of media needed to store data because the space freed is unused.

As briefly discussed above, FIG. 7 illustrates a storage segment 700 that includes a first header 702, a second header 703 that contains the same information as first header 702 and a byte pattern 701 located between first header 702 and second header 704. It should be noted that in another embodiment of the present invention, byte pattern 701 can be replaced with data in reserved portion 705. For example, byte pattern 701 can be replaced with compressed user data 704 and/or pad byte pattern 706. In addition, storage segment 700 also includes compressed user data 704, pad byte pattern 706, EDC 710 and ECC 712. Byte pattern 701 separates first header 702 from second header 703. Byte pattern 701 prevents a large error in one header from corrupting the other header. In accordance with the present invention, first header 702 is used for reading purposes. If, however, first header 702 contains an unrecoverable error, then second header 703 is used for reading purposes. Although FIG. 7 illustrates first header 702 and second header 703, one skilled in the art should recognize that storage segment 700 can contain a plurality of headers. Each of the plurality of headers contains the same information such that at least one of the headers is readable.

Figure 8:
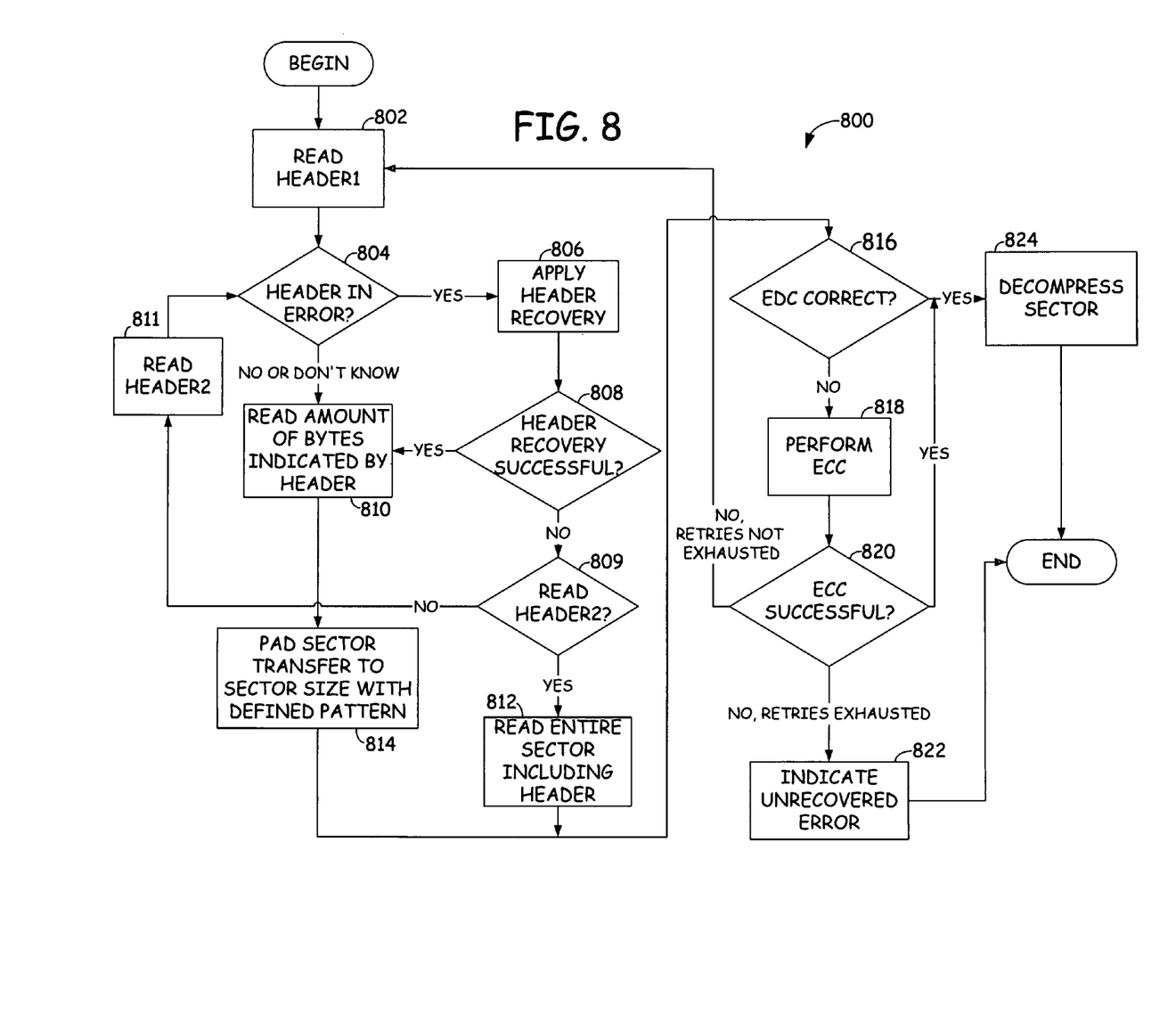
FIG. 8 illustrates a generalized flowchart describing the process of reading data from the storage segment illustrated in FIG. 7 in accordance with an embodiment of the present invention.

FIG. 8 illustrates a generalized flowchart 800 describing the process of reading data from storage segment 700 in accordance with an embodiment of the present invention. In particular, FIG. 8 illustrates the process of reading a storage segment that contains more than one header. The process of reading storage segment 700 begins at block 802 by reading first header 702. At block 804, the reading process determines if first header 702 is in error. If first header 702 is in error, header recovery is applied to first header 702 at block 806. If, however, header 702 is not in error or it is not known whether header 702 is in error, then control passes to block 810.

At block 808, the process determines whether header recovery was successful. If the header recovery was successful, control passes to block 810. If, however, header recovery was unsuccessful in recovering data, control passes to block 809 and determines whether second header 703 has been read. If second header 703 has not been read, than control passes to block 811 and second header 703 is read. If second header 703 has been read, then control passes to block 812.

At block 810, the reading process reads the length or bytes of compressed user data as indicated by either first header 702 or second header 703, depending on which header was successfully read. After reading the compressed user data, control is passed to block 814. At block 814, the reading process proceeds to pad sector transfer to sector size with defined pattern instead of reading pad byte pattern 706. Since pad byte pattern 706 is known data, block 814 eliminates a source of error by ignoring pad byte pattern 706 and padding in the data. The reading process, however, reads the entire storage segment 700 including the headers at block 812 if header recovery was unsuccessful. The reading process proceeds to block 816 after completion of either block 812 or 814.

At block 816, the reading process uses EDC data 710 to detect if any errors exist in reading compressed user data 704. If no errors exist, control passes to block 824 and decompresses the compressed user data. If, however, errors exist, control passes to block 818 and the process performs error correction using ECC 712. The process proceeds to block 820 and determines whether error correction was successful. If error correction was successful, then the process proceeds to block 824, decompresses the compressed user data and the reading process ends. If error correction is unsuccessful, then the process either proceeds to block 802 or block 822. The process proceeds to block 802 if an amount of retries for correcting errors is not exhausted. The process, however, proceeds to block 822 if all retries for error correction are exhausted. In the latter situation, the process indicates that there is an unrecovered error and the process ends. In the former situation, the process proceeds to block 802 and rereads all headers. Again, control passes to block 804 to determine if the headers are in error and proceeds through the above-described process to perform error correction if need be until user data can be decompressed in block 824 or the reading process indicates that there is an unrecoverable error in block 822.

Figure 9:
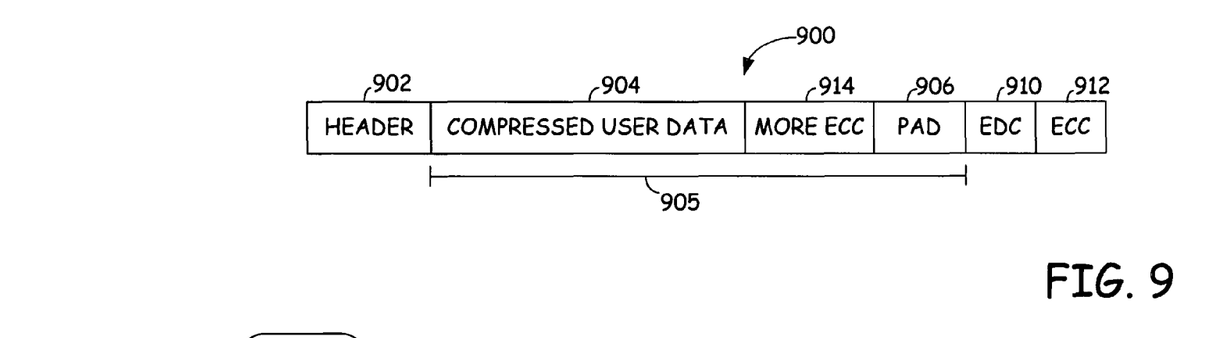
FIG. 9 illustrates a storage segment in accordance with an embodiment of the present invention.

FIG. 9 illustrates a storage segment 900 in accordance with an embodiment of the present invention. Storage segment 900 has a storage segment size. Storage segment 900 includes a header 902, compressed user data 904, a pad byte pattern 906 followed by different types of redundancy data such as ECC data 910 and EDC data 912 and additional ECC data 914. Header 902 includes information related to the compressed user data. At a minimum, header 902 includes the length or size of the compressed user data and can also include the maximum redundancy capability. Compressed user data 904 is reserved for a reserved portion 905 of storage segment 900. Reserved portion 905 has a data size corresponding to an uncompressed size of user data. Typically, the length of reserved portion 905 is 512 bytes. Unlike storage segment 400 illustrated in FIG. 4, the remaining portion of reserved portion 905 includes additional ECC data 914 and pad byte pattern 906. Although FIG. 9 illustrates additional ECC data 914, those skilled in the art should recognize that section 914 can be filled with different types of redundancy data other then ECC data. Having a maximum amount of ECC in storage segment 900 allows more errors in compressed user data 904 to be corrected. Pad byte pattern 906 is meaningless data used to fill the remaining portion of reserved portion such that the remaining portion is designated as unused. Those skilled in the art should recognize that the order of components 902, 904, 906, 910, 912 and 914 in storage segment 900 need not be organized as shown in FIG. 9. Each component can reside in any order in storage segment 900. In addition, those skilled in the art should recognize that EDC 910 and ECC 912 can be compressed in a similar fashion as compressed user data 904 to create more room for additional ECC. Furthermore, it should be recognized that storage segment 900 can contain multiple headers as illustrated in FIG. 7 such that the reliability of the header is increased.

Figure 10:
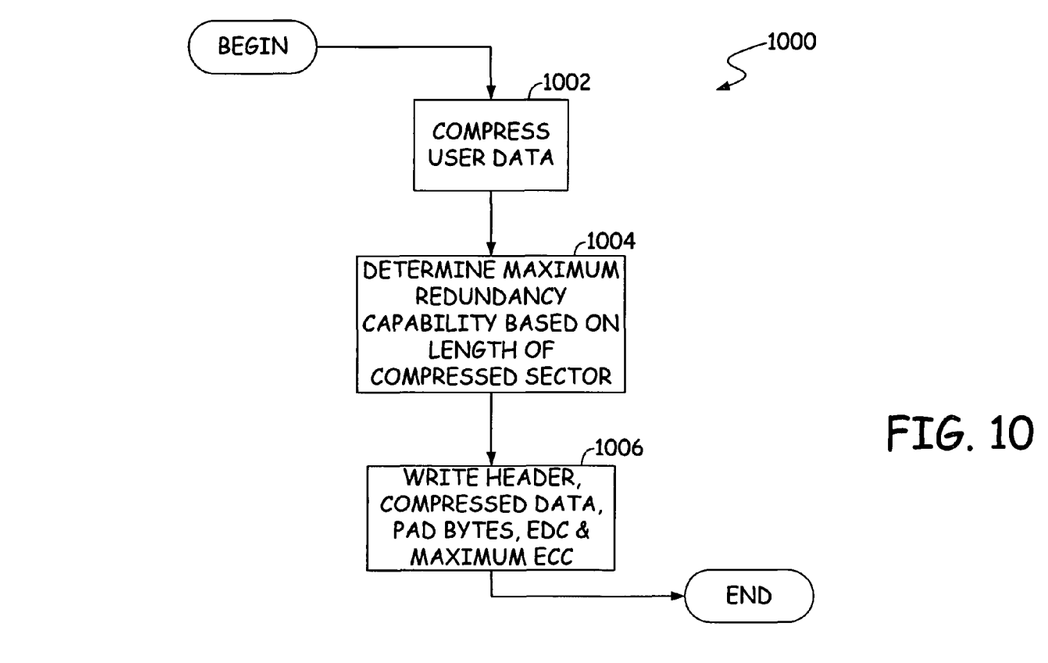
FIG. 10 illustrates a generalized flowchart describing the process of writing data to the storage segment illustrated in FIG. 9 in accordance with an embodiment of the present invention.

FIG. 10 illustrates a generalized flowchart 1000 describing the process of writing data to storage segment 900 in accordance with an embodiment of the present invention. At block 1002, user data is compressed prior to writing the user data to a storage segment such that header 902 can be determined. User data is compressed via compression circuitry as described above in FIG. 5. After user data has been compressed, the writing process passes to block 1004 and determines the maximum redundancy capability. For example, the writing process can determine the maximum ECC capability. The maximum redundancy capability can be determined based on the length of compressed user data or found in header 902. At block 1006, header 902, compressed user data 904, additional ECC data 914, pad byte pattern 906, EDC data 910 and ECC data 912 are written to storage segment 900. In general, the amount of ECC data 912 and additional ECC data 914 relates to the maximum redundancy capability. After writing at block 1006, the writing process ends.

Figure 11:
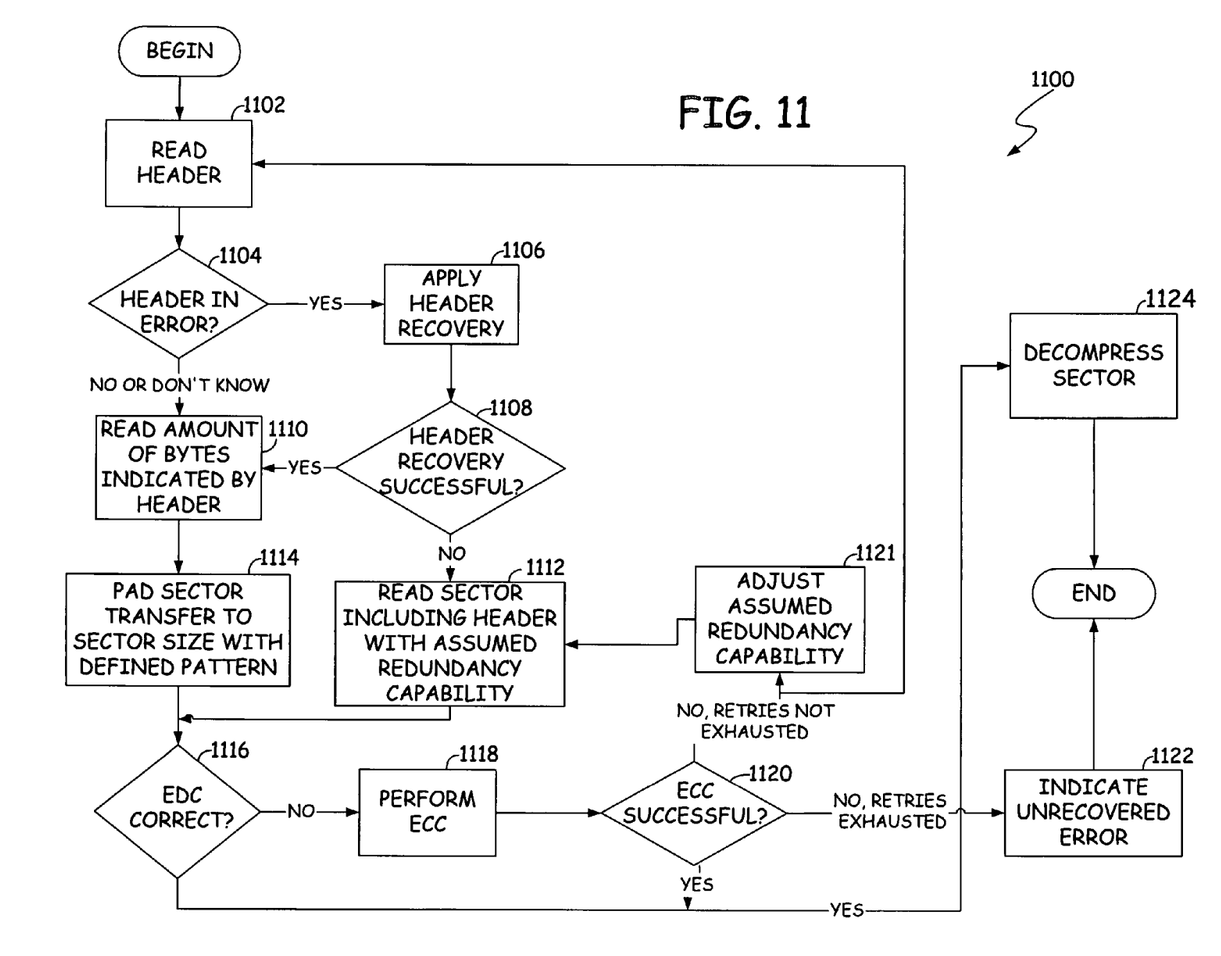
FIG. 11 illustrates a generalized flowchart describing the process of reading data from the storage segment illustrated in FIG. 9 in accordance with an embodiment of the present invention.

FIG. 11 illustrates a generalized flowchart 1100 describing the process of reading data from storage segment 900 in accordance with an embodiment of the present invention. The process of reading storage segment 900 begins at block 1102 by reading header 902. At block 1104, the reading process determines if header 902 is in error. If header 902 is in error, a header recovery routine is applied to header 902 at block 1106. If, however, header 902 is not in error or it is not known whether header 902 is in error, then control passes to block 1110.

After header recovery is applied in block 1106, control passes to block 1108. The reading process determines whether the applied header recovery was successful. If the header recovery was successful, control passes to block 1110. If, however, the header recovery was unsuccessful in recovering data in header 902, control passes to block 1112. At block 1110, the reading process reads the length or bytes of compressed user data as indicated by header 902 if the header is either not in error or header recovery was successful. After reading the compressed user data, control is passed to block 1114. At block 1114, the reading process proceeds to pad sector transfer to sector size with defined pattern instead of reading pad byte pattern 906. Since pad byte pattern 906 is known data, block 1114 eliminates a source of error by ignoring pad byte pattern 906 and padding in data. The reading process, however, reads the entire storage segment 900 including header 902 at block 1112 if header recovery was unsuccessful. In addition, the reading process assumes a redundancy capability based on ECC data 912 and additional ECC data 914. The reading process proceeds to block 1116 after completion of either block 1112 or 1114.

At block 1116, the reading process uses EDC data 910 to detect if any errors exist in reading storage segment 900. If no errors exist, control passes to block 1124 and the process decompresses the compressed user data. If, however, EDC data 910 determines that errors exist, control passes to block 1118 and performs error correction using either ECC data 912, additional ECC data 914 or a combination thereof. The process proceeds to block 1120 and determines whether error correction was successful. If error correction was successful, then the process proceeds to block 1124, decompresses the compressed user data and the reading process ends. If error correction is determined to be unsuccessful, then the process either proceeds to block 1121 or block 1102 if retries to read sector 900 are not exhausted or the process proceeds to block 1122 if all retries to read sector 900 are exhausted. The process proceeds to block 1102 if a retry includes rereading header 902. The process proceeds to block 1121 if a retry includes assuming a redundancy capability in header 902. At block 1122, the process indicates that there is an unrecovered error and the process ends. At block 1121, the process proceeds to adjust the assumed redundancy capability. Control passes to block 1112 and rereads the entire storage segment 900 including the header based on the adjusted assumed redundancy capability. At block 1102, the process proceeds to reread header 902. Ultimately, if either the process proceeds to block 1121 or 1102, control passes to block 1116 to determine if EDC 910 detects any errors and performs error correction if need be until user data can be decompressed in block 1124 or the reading process indicates that there is an unrecoverable error in block 1122.

As illustrated in FIGS. 9-11, the present invention improves the reliability of storage media by compressing user data on a sector-by-sector basis and filling the remaining space in the storage segment with additional error correction capability and/or pad byte pattern. Generally, the compression of data will reduce the amount of media needed to store data and use the space freed to incorporate additional error correction capability for the compressed data. It should be noted that there is a limited amount of additional error correction that can be placed in the remaining portion of the reserved portion of the storage segment because most implementations of error correction have a finite set of generation possibilities. A pad byte pattern can fill any of the remaining space in the reserved portion to again reduce the amount of media needed to store data.

Figure 12:
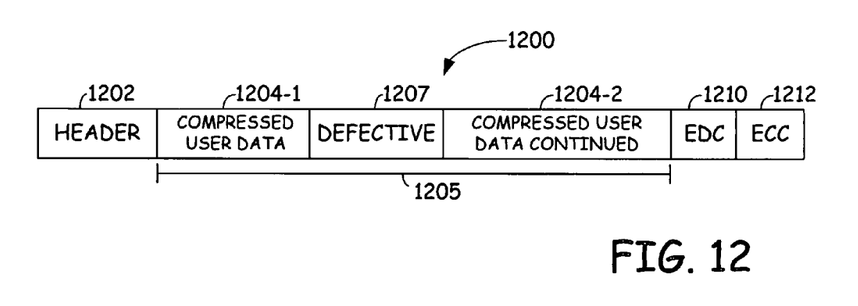
FIG. 12 illustrates a storage segment in accordance with an embodiment of the present invention.

FIG. 12 illustrates a storage segment 1200 in accordance with an embodiment of the present invention. Storage segment 1200 has a storage segment size. As illustrated in FIG. 12, storage segment 1200 includes a header 1202, compressed user data 1204-1 and 1204-2, a defective portion 1207 followed by different types of redundancy data, such as EDC data 1210 and ECC data 1212. Header 1202 includes information related to the compressed user data. At a minimum, header 1202 includes the length of the compressed user data and information specifying the location of the compressed user data. It can also include the maximum redundancy capability. Compressed user data 1204-1 and 1204-2 is reserved for a reserved portion 1205 of storage segment 1200. Typically, the length of reserved portion 1205 is 512 bytes. Reserved portion 1205 has a data size corresponding to an uncompressed size of user data. Unlike storage segment 400 illustrated in FIG. 4, storage segment 700 illustrated in FIG. 7 and storage segment 900 illustrated in FIG. 9, the remaining portion of reserved portion 1205 is occupied by defective portion 1207. Defective portion 1207 is a portion of storage segment 1200 where media 106 (FIG. 2) is defective. For example, defective portion 1207 is space on media 106 that could be a defect formed at the time of manufacture or could be a grown defect. Regardless of the type of defect, this space has been allocated by disc drive 100 as defective. Thus, compressed user data 1204-1 and 1204-2 can be "slid" around defective portion 1207 such that storage segment 1200 can still be used. For example, as compressed user data is written to storage segment 1200, the first part of compressed user data 1204-1 is written before defective portion 1207 and the second part of compressed user data 1204-2 is written after defective portion 1207. Those skilled in the art should recognize that compressed user data need not be "slid" around defective portion 1207 if defective portion 1207 is located elsewhere in storage segment 1200.

Although not illustrated in FIG. 12, a pad byte pattern can be written to any remaining space in reserved portion 1205 to designate that a portion of reserved portion 1205 as unused. In the alternative or in addition to, additional redundancy data, such as ECC data, can also be written to any remaining portion of reserved portion 1205. Those skilled in the art should recognize that the order of components 1202, 1204-1, 1204-2, 1207 and 1210 and 1212 in storage segment 1200 need not be organized as shown in FIG. 12. Each component can reside in any order in storage segment 1200. In addition, those skilled in the art should recognize that EDC data 1210 and ECC data 1212 can be compressed in a similar fashion as compressed user data 1204-1 and 1204-2 to create more room for additional ECC. Furthermore, it should be recognized that storage segment 1200 can contain multiple headers as illustrated in FIG. 7 such that the reliability of the header is increased.

Figure 13:
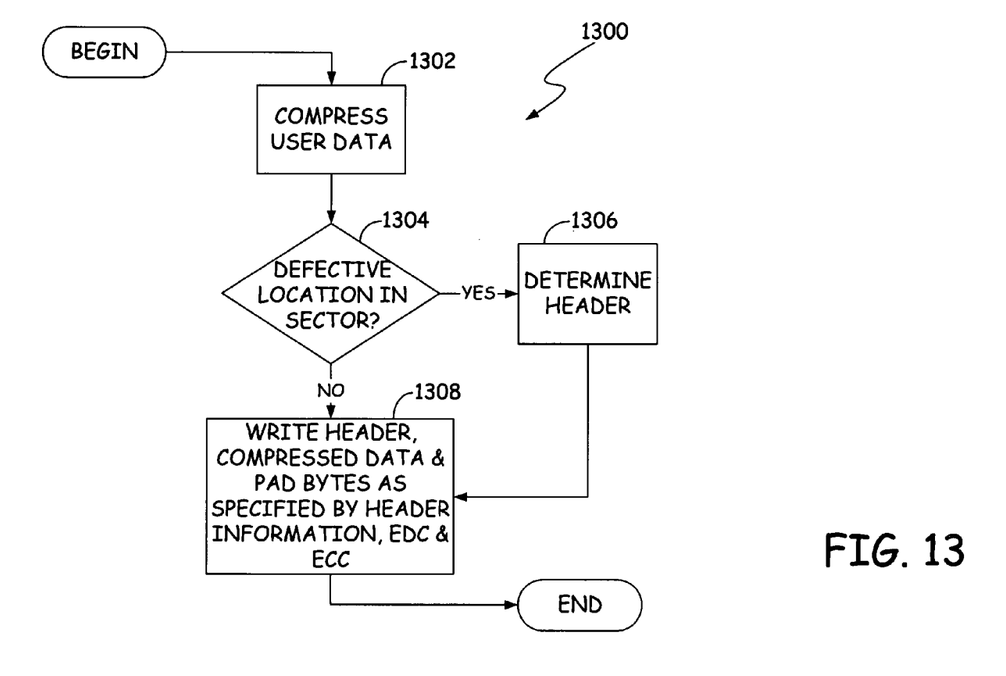
FIG. 13 illustrates a generalized flowchart describing the process of writing data to the storage segment illustrated in FIG. 12 in accordance with an embodiment of the present invention.

FIG. 13 illustrates a generalized flowchart 1300 describing the process of writing data to storage segment 1200 in accordance with an embodiment of the present invention. At block 1302, user data is compressed prior to writing the user data to a storage segment such that header 1202 can be determined. User data is compressed via compression circuitry as described above in FIG. 5. After user data has been compressed, the writing process passes to block 1304 and determines if there is a defective location, such as defective location 1207, in storage segment 1200. For example, defective locations can be tracked and/or determined during manufacture of media 106. If a defective location exists, then the writing process passes to block 1306 and determines what should be included in header 1202. After the process determines header information, the process passes to block 1308. If, however, there are no defective locations in storage segment 1200, then the process passes to block 1308. At block 1308, header 1202, compressed user data 1204-1 and 1204-2, EDC data 1210 and ECC data 1212 are written to storage segment 1200. In addition, a pad byte pattern and additional ECC can be written to storage segment 1200. In order for additional ECC to be written to storage segment 1200, the process must determine the maximum redundancy capability based on the length of the compressed user data and the amount of space that a defective location occupies. After writing at block 1306, the writing process ends.

Figure 14:
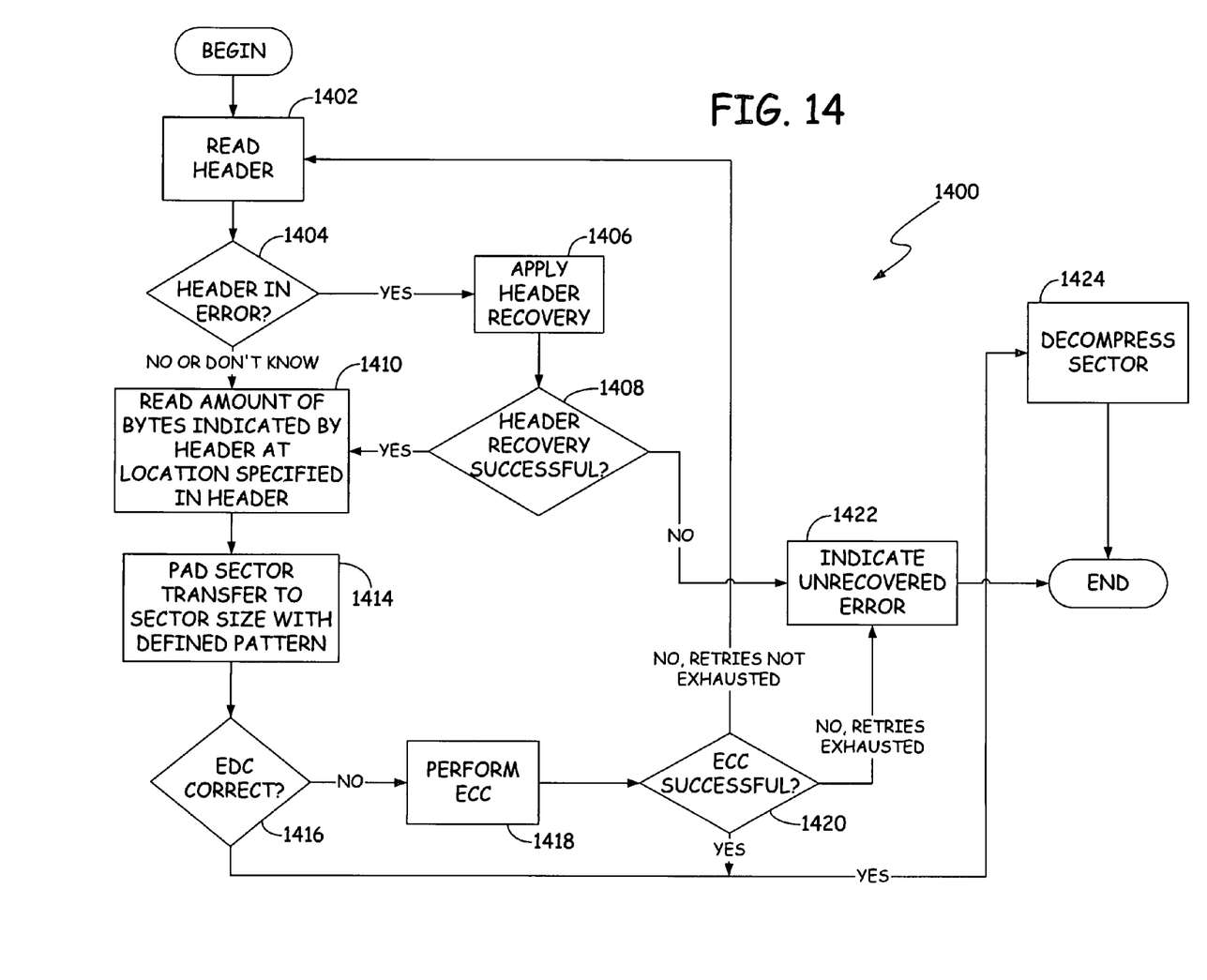
FIG. 14 illustrates a generalized flowchart describing the process of reading data from the storage segment illustrated in FIG. 12 in accordance with an embodiment of the present invention.

FIG. 14 illustrates a generalized flowchart 1400 describing the process of reading data from storage segment 1200 in accordance with an embodiment of the present invention. The process of reading storage segment 1200 begins at block 1402 by reading header 1202. At block 1404, the reading process determines if header 1202 is in error. If header 1202 is in error, header recovery is applied to header 1202 at block 1406. Otherwise, if header 1202 is not in error or it is not known whether header 1202 is in error, then control passes to block 1410.

After header recovery is applied in block 1406, control passes to block 1408. The reading process determines whether the applied header recovery was successful. If header recovery was successful, control passes to block 1410. If, however, header recovery was unsuccessful in recovering data in header 1202, control passes to block 1422. At block 1410, the reading process reads the length or bytes of compressed user data as indicated by header 1202 at the location specified in header 1202 if the header is either not in error or header recovery was successful. After reading the compressed user data, control is passes to block 1414. At block 1414, the reading process proceeds to pad sector transfer to sector size with defined pattern instead of reading a pad byte pattern. In this example, storage segment 1200 does not have a pad byte pattern. Thus, block 1414 is only utilized if a pad byte pattern exists. Since a pad byte pattern is known data, block 1414 eliminates a source of error by ignoring a pad byte pattern and padding in the data. The reading process, however, indicates that there is an unrecoverable error at block 1422 if header recovery was unsuccessful. The reading process proceeds to block 1416 after completion of block 1414.

At block 1416, the reading process uses EDC data 1210 to detect if any errors exist in reading compressed user data 1204-1 and 1204-2. If no errors exist, control passes to block 1424 and decompresses the compressed user data. If, however, errors exist, control passes to block 1418 and performs error correction using ECC data 1212 and, if segment 1200 includes additional ECC, the additional ECC can be used to perform error correction. The process proceeds to block 1420 and determines whether error correction was successful. If error correction was successful, then the process proceeds to block 1424, decompresses the compressed user data and the reading process ends. If error correction is determined to be unsuccessful, then the process either proceeds back to block 1402 or proceeds to block 1422. The process proceeds to block 1402 if an amount of retries for correcting errors is not exhausted. The process, however, proceeds to block 1422 if all retries for error correction are exhausted. In the latter situation, the process indicates that there is an unrecoverable error and the process ends. In the former situation, the process proceeds to block 1402 and rereads header 1202. Again, control passes to block 1404 to determine if the header is in error and proceeds through the above-described process to perform error correction if need be until user data can be decompressed in block 1424 or the reading process indicates that there is an unrecoverable error in block 1422.

As illustrated in FIGS. 12-14, the present invention improves the reliability of storage media by compressing user data on a sector-by-sector basis such that user data is not written to defective locations in a storage segment. Any remaining space in the reserved portion of the storage segment that does not contain compressed user data or a defect is filled with additional error correction capability and/or pad byte pattern. Generally, the compression of data will reduce the amount of media needed to store data such that the space freed houses defects and/or incorporates additional error correction capability. It should be noted that there may be a limited amount of additional error correction that can be placed in the remaining portion of the reserved portion of the storage segment because most implementations of error correction have a finite set of generation possibilities. A pad byte pattern can fill any of the remaining space in the reserved portion to again reduce the amount of media needed to store data.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application, while maintaining substantially the same functionality without departing from the scope and spirit of the present invention. In addition, although the preferred embodiment described herein is directed to a method and apparatus for increasing the reliability of data stored in storage segments of data storage systems, it will be appreciated by those skilled in the art that the teachings of the present invention can be applied to other types of storage systems, without departing from the scope and spirit of the present invention.

What is claimed is:

1. A method comprising:
compressing a block of data to a compressed data size smaller than an uncompressed data size;
formatting the compressed block of data to store the compressed data on a storage segment of a data storage media including a reserved portion having a data size corresponding to an uncompressed data size of the compressed data and to provide an unused portion of the reserved portion of the storage segment having a data size equal to a difference between the uncompressed data size and the compressed data size;
adding at least one of redundancy data or a pad pattern to fill the unused portion of the reserved portion of the storage segment; and
data and the at least one of the redundancy data or the pad pattern to the reserved portion of the storage segment having the uncompressed data sizewriting a pad byte pattern to any remaining portion of the reserved portion of the storage segment.

2. The method of claim 1 wherein the step of adding the at least one of the redundancy data or the pad pattern includes adding the redundancy data and further comprising:
determining a maximum redundancy capability of the storage segment based on a length of the compressed data; and
writing the redundancy data to the unused portion of the storage segment based upon the maximum redundancy capability.

3. The method of claim 1 and further comprising:
determining header information related to a length of the compressed data; and
writing the header information to the storage segment.

4. The method of claim 3, wherein writing the header information to the storage segment comprises writing the header information to the storage segment more than once to create a plurality of identical headers for the storage segment.

5. The method of claim 3 wherein adding the at least one of the redundancy data or the pad pattern includes adding the redundancy data and comprising:
reading the header information; and
using the redundancy data to recover the header information.

6. The method of claim 5 and further comprising:
assuming a redundancy capability if a header error recovery is unsuccessful; and
performing error correction using the assumed redundancy capability.

7. The method of claim 1 wherein the redundancy data and the pad pattern are added to fill the unused portion of the reserved portion of the storage segment.

8. The method of claim 1 wherein the step of adding the at least one of the redundancy data or the pad pattern includes adding the redundancy data and the redundancy data includes at least one of error correction code or error detection code.

9. The method of claim 1 and comprising:
appending at least one of error correction code or error detection code to the compressed data and the redundancy data or the pad pattern of the unused portion of the reserved portion of the storage segment; and
writing the at least one of the error correction code or the error detection code to the storage segment.

10. The method of claim 1 and comprising:
transferring the compressed data and the at least one of the redundancy data or the pad pattern of the unused portion to a read/write channel to write the compressed data and the at least one of the redundancy data or pad pattern of the unused portion to the reserved portion of the storage segment.

11. A method comprising:
compressing a block of data from an uncompressed data size to a compressed data size;
formatting the compressed data for storage on a storage segment of a storage media including a reserved portion having a data size corresponding to the uncompressed data size of the compressed data;
providing an unused portion of the reserved portion of the storage segment having an unused portion size defined by a difference between the compressed data size and the uncompressed data size;
determining whether a defective location exists in the storage segment; and
aligning the unused portion with the defective location and writing the compressed data to the reserved portion of the storage segment outside the unused portion.

12. The method of claim 11 and further comprising writing redundancy data to the storage segment based on the size of the defective location and a maximum redundancy capability.

13. The method of claim 1 and further comprising reading the storage segment and decompressing the data.

14. A storage system comprising:
a plurality of storage segments, each storage segment including a reserved portion having a data size corresponding to an uncompressed data size;
compression circuitry configured to compress data from the uncompressed data size to a compressed data size;
processing circuitry configured to:
format the compressed data to write the compressed data to the reserved portions of the plurality of storage segments and add additional data to fill an unused portion of the reserved portion of each of the storage segments having a size defined by a difference between the compressed data size and the uncompressed data size; and
write the compressed data and the additional data to the reserved portions of each storage segment.

15. The storage system of claim 14, wherein the compression circuitry is implemented in one or more of a host system, buffer, formatter and exclusive-OR operator and is configured to compress the data.

16. The storage system of claim 14, wherein the additional data includes redundancy data and the processing circuitry is further configured to determine a maximum redundancy capability of each storage segment based on a length of the compressed data and write the redundancy data to each of the storage segments based upon the maximum redundancy capability.

17. The system of claim 14 wherein the additional data includes at least one of redundancy data or a pad pattern.

18. The system of claim 14 wherein the additional data includes redundancy data and a pad pattern.

19. The system of claim 14 wherein the storage segment includes at least one of error correction code or error detection code and the processing circuitry is configured to append the at least one of the error correction code or the error detection code to the compressed data and the additional data in the unused portion of the reserved portion of the storage segment.

20. The system of claim 14 wherein the uncompressed data size is 512 bytes.

* * * * *